Figure 1:
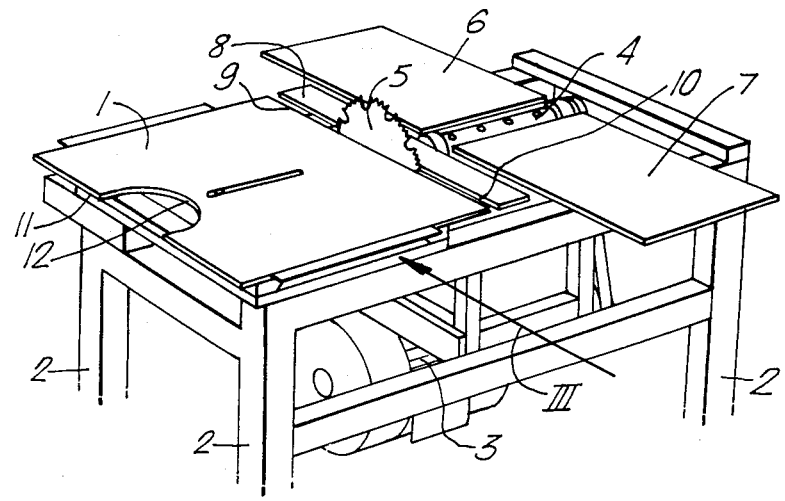

United States Patent [19]

Haeger

[11] Patent Number: 4,546,804
[45] Date of Patent: Oct. 15, 1985

[54] WOODWORKING MACHINE

[76] Inventor: Oyvind Haeger, Ulvåsveien 3, Gimle, 1750 Halden, Norway

[21] Appl. No.: 463,305

[22] Filed: Feb. 2, 1983

[30] Foreign Application Priority Data

Feb. 16, 1982 [NO] Norway ................................ 820472

[51] Int. Cl.⁴ ............................................. B27C 9/02
[52] U.S. Cl. ...................................... 144/1 G; 83/574; 144/1 R; 144/286 R; 144/287
[58] Field of Search .............. 144/1 R, 1 E, 1 F, 1 G, 144/286 R, 287; 269/289 R, 292, 290; 83/574

[56] References Cited

U.S. PATENT DOCUMENTS 3,771,579 11/1973 Heuze ................... 144/1 G
4,201,254 5/1980 Fehric ................... 144/1 G

FOREIGN PATENT DOCUMENTS

| 104246 | 6/1938 | Australia ........................... 144/1 G |
| 805940 | 6/1951 | Fed. Rep. of Germany . |
| 2039207 | 2/1972 | Fed. Rep. of Germany . |
| 2116550 | 10/1972 | Fed. Rep. of Germany ..... 144/1 G |
| 43918 | 4/1927 | Norway . |
| 85340 | 2/1955 | Norway . |

*Primary Examiner*—W. D. Bray
*Attorney, Agent, or Firm*—Cushman, Darby & Cushman

[57] ABSTRACT

On a woodworking machine having an arbor whose position can be adjusted from the horizontal to the vertical and which carries tools such as a circular saw blade, milling tool, planers, drill attachments, etc., the worktable is divided into sections, wherein the section proximate the slot for the circular saw blade is adjustable in a direction parallel to the circular saw blade and in a direction at right angles thereto. The table section is also reversible and suitably formed for woodworking operations carried out with a vertically-oriented arbor.

2 Claims, 7 Drawing Figures

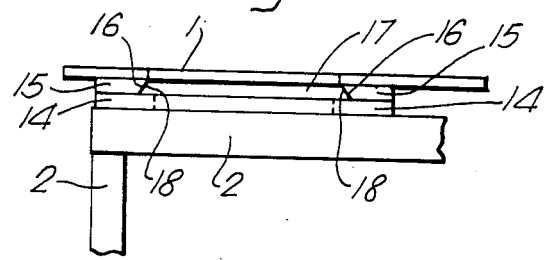
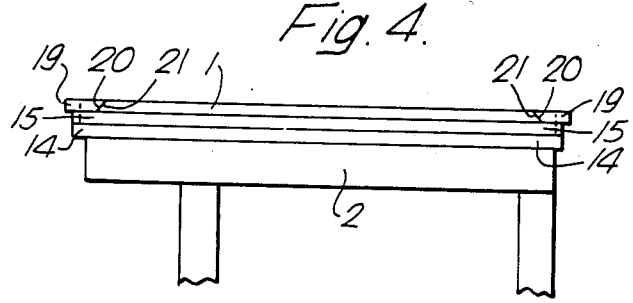
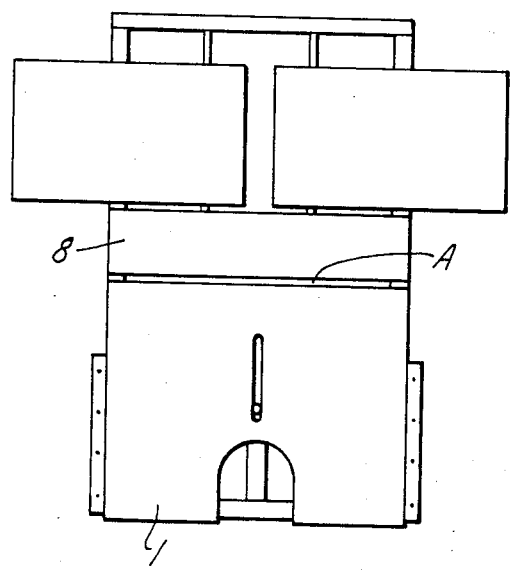

WOODWORKING MACHINE

The present invention relates to a woodworking machine of the type which comprises a support stand which rests on the floor and carries a motor-driven drive means with an arbor for various tools such as a saw blade, rough planer, finishing planer, milling tool, drill attachments and the like, wherein the drive means with the arbor can be set at various heights and the arbor adjusted at various angles from a horizontal to a vertical position.

A number of such machines are previously known, and examples may be found in Norwegian Pat. Nos. 43.918 and 85.340, German Pat. No. 805.940, and German Patent Publications Nos. 2.039.207 and 2.116.550.

The prior art machines require extensive readjustment when changing tools, and despite the readjustment it may be difficult to execute the desired woodworking operation properly, especially when working on large workpieces, for instance when cutting construction plates and the like. One of the reasons for these problems is that on the prior art embodiments or woodworking machines, a milling tool, for example, may occupy the same area as the saw blade, and both tools must be taken into account when forming the opening in the worktable. The opening thus provided is therefore not ideal for either of the woodworking operations. When sawing, there will be an opening whose width at least at a certain section is far greater than the circular saw requires; similarly, a milling tool which requires the width at this section of the opening does not require the elongated slot which the saw blade needs. To remedy the problems which arise owing to this condition, some embodiments of woodworking machines of this type have been made with replaceable tabletops, but this solution requires storage space and elaborate adjustment of the machine. Even in the case of machines which only have a circular saw, the slot for the saw blade has to be unnecessarily wide in order to perform ordinary tasks, because space must be provided for adjusting the saw blade at angles from the vertical plane up to 45° to one or both sides.

The main object of the present invention is to arrive at details on a tabletop for a woodworking machine which eliminate the above drawbacks. This is obtained by providing a tabletop divided into sections, wherein at least the section facing toward one side of the circular saw blade is adjustable, such that the edge of this table section which faces toward the circular saw blade and forms one of the slot-defining members for the saw blade can be set as closely as desired to the saw blade no matter what the angle of the blade, i.e., whether it is vertical or is set at a 45° angle in relation to the vertical plane.

In this manner, the saw blade slot can be made so narrow that even small workpieces can be worked on without the risks involved in prior art embodiments when such work-pieces have to pass large openings.

Not only can the table section be moved toward and away from the circular saw blade, but it is also easily reversible, and at the other side edge has a recess or opening which fits around the arbor and a milling tool carried thereon as closely as practicable. When milling operations are being performed, therefore, the table section will form a closed surface which provides good support for workpieces of any size.

In addition to the above features, the table section is movably mounted on a frame which itself is movably mounted on the machine's support stand, said frame being movable in a direction which corresponds to the sawing direction of the circular saw blade. It is thus possible to clamp workpieces to the table section and cut them with the circular saw blade, or mold them with the milling tool, or drill elongated holes in them with proper drilling tool.

Figure 6:
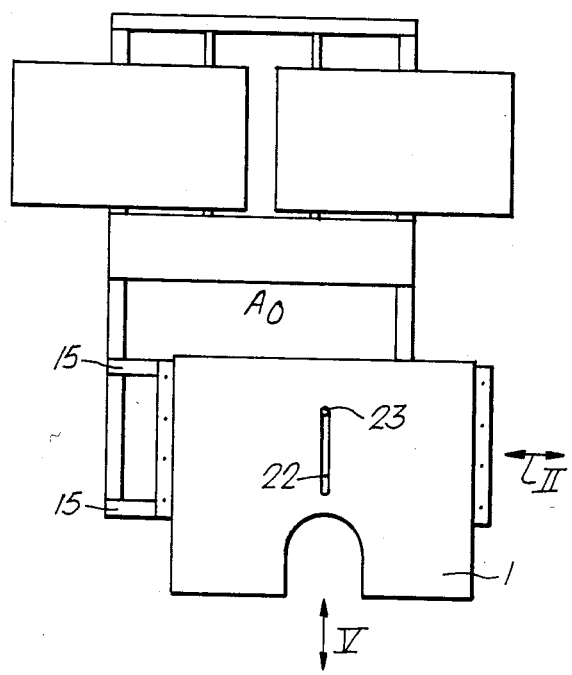
Figure 7:
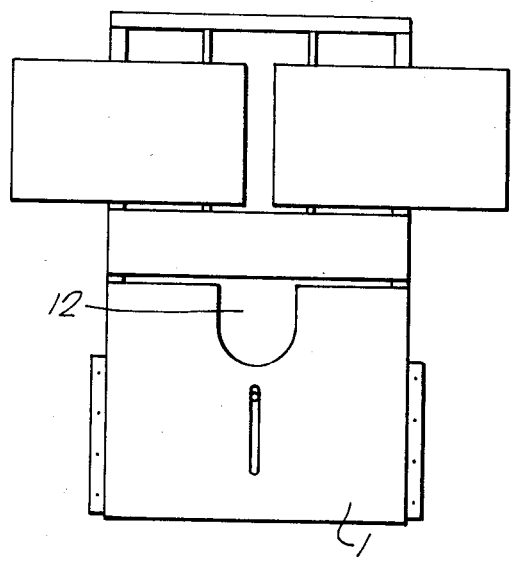

The invention is characterized by the features recited in the appurtenant patent claim. It will be explained in greater detail in the following with reference to the accompanying drawings, wherein FIG. 1 shows the top portion of a woodworking machine made in accordance with the invention, seen from the side from which material which is to be sawn is introduced into the machine, FIG. 2 shows the machine from the opposite side, as compared to FIG. 1, FIG. 3 shows a detail of the machine, seen in the direction of the arrow III, FIG. 4 shows a detail of the machine seen in the direction of the arrow IV, FIG. 5 shows the worktable for the machine, seen from above in the direction for sawing or planing, FIG. 6 shows the same view as FIG. 5, but with the movable table section pulled back from the circular saw blade and displaced in relation thereto, and FIG. 7 shows the worktable set up for a milling operation.

FIG. 1, in a highly simplified and schematic manner, shows the top of a woodworking machine. The machine comprises a stand 2 in which a drive means is suspended; only the motor 3 is shown. V-belts lead from the motor to an arbor which in FIG. 1 carries a planer 4 and a circular blade 5. A worktable is divided into sections 1, 6 and 7, the sections 6 and 7 providing support for the material which is to be planed with the planer 4 in a manner known per se. The motor with the drive means can be raised and lowered by operating a regulating mechanism (not illustrated) for adjusting the cutting depth of the saw blade and planer. Together with an elongated table section 8, the edge 9 of the table section 1 forms the slot 10 for the saw blade. The opposite edge 11 of the table section 1 has a recess 12, and the table section can be turned around into the position shown in FIG. 2, where the machine has been readied for performing milling work by turning the drive means with the motor 90° so that the arbor 13 stands vertical. The table section 1 has been turned around so that the recess 12 surrounds the arbor.

The structural solutions are shown in detail in FIGS. 3 and 4. The stand 2 carries a support 14 for rails 15 which have an undercut groove 16 on both sides. A frame 17 which bears the table section 1 has sloping edges 18 which fit the undercut grooves, and the various parts are adapted to permit the frame 17 with the table section 1 to move in the direction indicated by the arrow II in FIG. 6.

Figure 2:
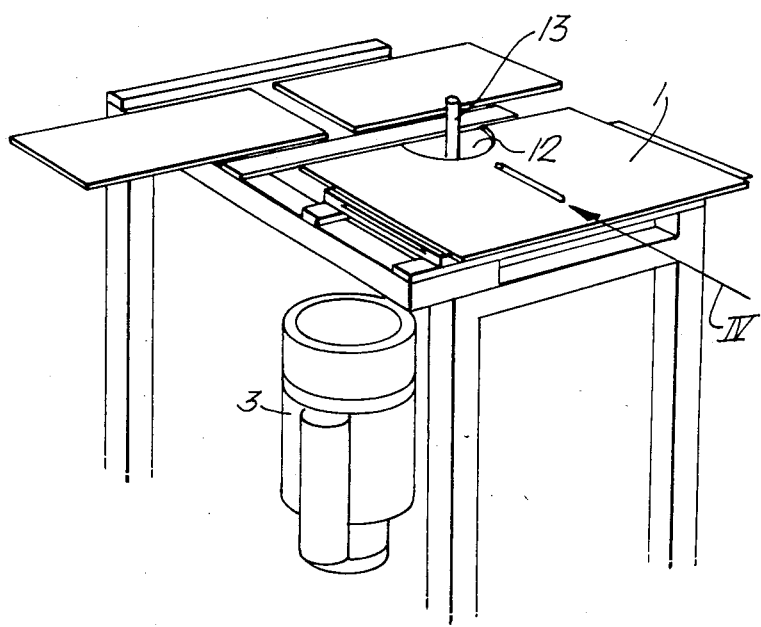

FIG. 4 shows what one sees in the direction of the arrow IV in FIG. 2. The table section 1 is movably mounted on the frame 17, which is not visible in FIG. 4, but the table section 1 rests on and is retained by rails 19 with undercut grooves 20 which are adapted to sloping edges 21 provided on the table section 1. With the table section 1 movably mounted in this manner, it is thus possible to move the table section toward and away from the work area A, as indicated by the arrow V in FIG. 6.

In FIG. 5, the table 1, 8 has been readied for work with the circular saw which is located in the work area A, and the slot this area forms, owing to the described adjustment possibilities, can be made as narrow as desired, according to the orientation of the circular saw blade. It is naturally advantageous that the slot A be as narrow as at all possible, but if the saw blade is set at an angle, perhaps as much as 45°, it may be necessary to adjust the table section, as indicated by the arrow V in FIG. 6. A slot 22 is provided in the table section 1 which by engagement with a pin 23 in the underlying frame restricts the movement of the table section 1 in the direction indicated by the arrow V in FIG. 6. If stop/support members are set up in the conventional manner to clamp the workpiece in place on the table section 1, then by moving the section with the workpiece in the direction of the arrow II one can make cuts in the workpiece at desired angles or perform other operations depending on the tool which is in use at any time. If the pin 23 (FIG. 6) is removed, the table section 1 can be detached completely, turned around and repositioned in the reversed position, and as shown in FIG. 7, the recess 12 in the table section will then face inwardly toward the center of the machine, a table position which is well suited for milling operations with the arbor 13 and drive unit set in the position shown in FIG. 2.

The undercut grooves for guiding the frame on the support stand and for guiding the table section on the frame can be made in various ways, for example milling them out of a piece of material, but a preferred solution is as shown, with the slide paths on the various surfaces being formed by two steel channel members, for example wedge steel, where the upper part has a downwardly sloping surface which fits a corresponding upwardly sloping surface at the respective edges of the frame and table section.

The example shown and described hereinabove is meant only to illustrate the invention, and should not be construed as limiting the scope of protection provided by this patent.

Having described my invention, I claim:

1. In a woodworking machine: a support stand; motor-driven drive means for a plurality of rotatable woodworking tools and means for mounting said drive means on said support stand, said drive means including a motor and a tool-receiving arbor driven by the motor; a worktable for supporting a workpiece, said table comprising a plurality of sections arranged with openings between them for the various tools, one of said table sections having an edge which defines an edge of one of said tool-receiving openings; and mounting means for said one table section providing for movement of said one table section in a single plane in two directions which are perpendicular to each other, movement in one of said directions being toward and away from at least one other table section which has an edge defining a further edge of said one tool-receiving opening whereby movement in said one direction enlarges or reduces the size of said one tool-receiving opening.

2. A woodworking machine as in claim 1 wherein said mounting means for said drive means includes means for pivoting said drive means such that said arbor is selectively positionable in first and second positions, said arbor in said first position extending in a plane parallel with the plane of said one opening such that a circular saw blade attached to said arbor projects through said one opening, and said arbor in said second position extending transverse to the plane of said one opening so as to extend through said one opening and to receive a milling tool.

* * * * *